(12) United States Patent
Da Costa

(10) Patent No.: US 8,511,078 B2
(45) Date of Patent: Aug. 20, 2013

(54) HYBRID WAVE ENERGY PLANT FOR ELECTRICITY GENERATION

(75) Inventor: Paulo Roberto Da Costa, Niteroi (BR)

(73) Assignee: Seahorse Wave Energy—Energia das Ondas S/A, Rio de Janeiro (BR)

( * ) Notice: Subject to any disclaimer, the term of this patent is extended or adjusted under 35 U.S.C. 154(b) by 917 days.

(21) Appl. No.: 12/449,572

(22) PCT Filed: Mar. 13, 2008

(86) PCT No.: PCT/BR2008/000071
§ 371 (c)(1),
(2), (4) Date: Aug. 13, 2009

(87) PCT Pub. No.: WO2008/128307
PCT Pub. Date: Oct. 30, 2008

(65) Prior Publication Data
US 2010/0013229 A1 Jan. 21, 2010

(30) Foreign Application Priority Data
Apr. 19, 2007 (BR) ...................................... 0704656

(51) Int. Cl.
*F03B 13/18* (2006.01)
(52) U.S. Cl.
USPC .................................. 60/398; 60/497; 290/53
(58) Field of Classification Search
USPC ............. 60/398, 495, 497, 500, 506; 290/53
See application file for complete search history.

(56) References Cited

U.S. PATENT DOCUMENTS

| | | | |
|---|---|---|---|
| 2,715,366 A | | 8/1955 | Vartiainen |
| 4,076,463 A | * | 2/1978 | Welczer ......................... 60/497 |
| 4,105,368 A | * | 8/1978 | Waters ............................ 60/506 |
| 4,281,257 A | | 7/1981 | Testa et al. |
| 4,302,291 A | * | 11/1981 | Severs et al. .................. 376/293 |
| 4,560,884 A | * | 12/1985 | Whittecar ....................... 290/53 |
| 4,622,473 A | * | 11/1986 | Curry ............................. 60/495 |
| 6,029,595 A | * | 2/2000 | Bachmann .................... 114/125 |
| 7,298,054 B2 | * | 11/2007 | Hirsch ............................. 290/53 |
| 7,781,903 B2 | * | 8/2010 | Buffard et al. .................. 290/53 |
| 7,808,120 B2 | * | 10/2010 | Smith .............................. 290/53 |
| 7,918,625 B2 | * | 4/2011 | Kelly et al. .................... 60/498 |
| 7,956,479 B1 | * | 6/2011 | Bergman ........................ 290/53 |
| 2005/0099010 A1 | * | 5/2005 | Hirsch ............................ 290/42 |

FOREIGN PATENT DOCUMENTS

| WO | 99/28622 | 6/1999 |
|---|---|---|
| WO | WO 9928622 A1 * | 6/1999 |

* cited by examiner

*Primary Examiner* — Thomas E Lazo
(74) *Attorney, Agent, or Firm* — Fildes & Outland, P.C.

(57) ABSTRACT

The innovation herein proposed describes a plant to produce electricity by the sea waves. The plant is designed to be installed on shore, near shore and offshore scenarios: on the coast line, in shallow waters and in deep waters. The plant is operated by action of the sea waves on a series of floaters (A). The resultant force on each floater (A) acts on a mechanical load amplifier (B) which moves two vertical high pressure piston pumps (C). These pumps (C) send pressurized fresh water to a hyperbaric system (E). The hyperbaric system (E) supplies an outflow water jet through a controlled valve that moves a conventional turbine (G). This turbine (G) connected to the electric generator (H) produce electricity.

19 Claims, 4 Drawing Sheets

HYBRID WAVE ENERGY PLANT FOR ELECTRICITY GENERATION

TECHNICAL FIELD

The proposed concept deals with an ocean wave energy device for electricity generation. It is composed by three main systems working together: the pumping modules, the high pressure system and the electricity generation group. Each pumping module is composed by a floater, a damper, two hydraulic pumps and a mechanical load amplifier. The high pressure system consists of both hyperbaric chamber and hydraulic accumulator. The generation group involves the turbine, the electric generator and the plant control module.

PREVIOUS TECHNIQUES

In the year 1799 in France, the wave energy was employed directly to drive pumps, mills and other heavy mechanisms. Since then, experiences with different concepts have been carried out worldwide.

Following the oil crisis of the 70's, the scientific research has provided significant improvements to the technology for extracting increased amounts of electricity from wave energy, particularly in Europe.

Currently the electricity produced through the ocean wave energy is already treated commercially in a few cases. Some examples are: Netherlands with the project AWS (Archimedes Wave Swing) with 2 MW of maximum power capability, Portugal with the project OWC (Oscillating Water Column) with 400 kW and the United Kingdom with the project LIMPET with 500 kW. In Denmark installation tests have been performed for the project WAVE DRAGON, with potential power generation up to 4 MW.

The United States, Canada, Australia, Ireland, Norway, New Zealand, Spain, Sweden, Greece, India, China, Korea and Japan are examples of countries that had been working in research and development on ocean wave energy.

During search working on other patents on this subject, although it was verified some visual similarities with this invention, it was not found technical similarities neither on the operational parameters nor in the general concept. The innovation aspect of this invention is in its fundamental concept that permits earnings in power efficiency taking to lowest final costs because the moving mechanism of load amplification is inside each floater. This innovation besides reducing the generation costs, permits operation pressure up to 3,000 psi (204 bar). This eliminates friction losses that exist on other concepts having components such as long arms and big bearings.

It was not found other patents in which the devices operate in these pressure levels. Another singularity of this invention is its versatile form that permits the installation in three different operational conditions: onshore, near shore and offshore.

The examined patent PI0402375-7 A has a long arm connected to a floater at one end, and is articulated at the other end to move a hydraulic pump positioned on a concrete basis on shore. This arm actuates like a lever to increase the load on the pump in a certain rate. These are the fundamental differences concerning to the present invention.

The pumping systems of the present invention are installed inside each floater. The arms that appear on the sketch of the onshore model of this invention have the only function of maintaining the device operating at the same site without moving aside.

The patent PI 0005509-3 A has each hydraulic cylinder attached to a single metallic structure like a cantilever beam from the shore to the floater. The hydraulic cylinders operate pumping water in both directions, during the up and down movements of the floaters. The hydraulic cylinders are connected near one end of a small arm and the other end of the arm is connected to the floater. The concept operates then with low pressure. The operation of the cylinders in both senses implies in stopping the system as the pressure grows up. The water reservoir that appears on drawings is a low pressure vessel. According to this explanation, there are significant differences between the above mentioned patent and the present invention.

The device of the patent PI 8907920-5 A operates with three hydraulic cylinders connected to the arm at one end. After the pivoting point, the floater is connected to the other end of the arm. The load from the floater movement is divided among three hydraulic cylinders, so the working pressure is low. The pumped water flow is sent straight to the hydraulic motor without using a hydraulic accumulator. Therefore it presents an intermittent operational behavior as a consequence of the also intermittent characteristic of the sea waves. The time period of the sea waves is in a range of 3 to 18 seconds depending on the site, region or country. According to these points, this device concept differs greatly from the present invention in which the high pressure system gives the possibility of constant flow due to the pressure stability.

The device of the patent PI 0415344-8 A operates with pairs of arms positioned in opposite directions. The concept operates with several hydraulics motors connected to the generators. This configuration needs an electronic system to put together the electricity from different power generators to stabilize voltage, frequency and phase angle. This procedure may lead to a prohibitive cost for high amount of electricity generation. In this sense there are no similarities in concept between this patent and the present invention.

SUMMARY OF THE INVENTION

The proposed concept of the Hybrid Wave Energy Plant has its own particularity considering the points outlined below:
  To produce electricity the plant can be assembled in three different scenarios: onshore, near shore and offshore.
  The floaters and moving mechanisms are the same for all scenarios. Inside each floater there is a mechanical load amplifier which induces motion to the actuators of two independent pumps.
  The plant operates with a hyperbaric chamber combined with a hydraulic accumulator. Both are designed to operate in a wide range of pressure. They can operate with pressures up to 3,000 psi or 204 bar or 20 MPa (equivalent to 2,000 meters of water column).
  Onshore and near shore models incorporate a telescopic hydraulic system to compensate tide variation levels.
  The offshore model employs a self controlling damper for operations in deep waters. It requires an automatic control for the self positioning of the damper which allows the full range of the floater heave motion in relation to the damper during operational conditions.

DETAILED DESCRIPTION OF THE INVENTION

The present invention describes a wave energy device that is composed by three systems: pumping modules, high pressure system and electricity generation group. Every pumping module has a floater, a damper, two hydraulic pumps and a mechanical load amplifier. The high pressure system contains the hyperbaric chamber, and the hydro pneumatic accumulator. The generation group is composed by the turbine, electric generator and the plant control module.

For offshore applications a damper system is employed in order to maximize the relative motion between load amplifier and the pumps.

Description of the Operational Mode of the Plant and of the Equipment Parts

The present invention describes a wave energy converter that operates through the action of the sea waves on cylindrical shape floaters named pumping modules. These modules move up and down pumping water in high pressure. Each floater induces a load between the damper and the inside mechanical load amplifier system. This system is composed by a double rack and two geared levers in a ratio of 1:10 (one to ten). The amplified load acts on a set of two vertical piston pumps to send fresh water to the hydro pneumatic accumulator. This accumulator is connected to the hyperbaric chamber which works in analogy to a mechanical lung. The pumped water in high pressure is set free from the hydro pneumatic accumulator through a controlled outflow valve to move the turbine. The turbine axle rotation is transmitted to an electric generator to convert mechanical energy into electricity.

The outflow valve is operated through an electronic control to maintain the turbine rotation speed. This valve operates with pressures up to 3,000 psi (20 MPa) and is designed to outflow fresh water in a range from 0.05 m³/s to 0.5 m³/s.

DESCRIPTION OF THE PREFERRED EMBODIMENTS

The proposed concept as a Hybrid Wave Energy Plant is designed to be installed in three different scenarios to produce electricity. If it is installed on the coast it is an onshore plant. If it is installed on shallow waters it is a near shore plant and if it is installed on deep waters it is an offshore plant. The decision about the best option depends on the both bathymetry and wave climate as well as the adequacy with local activities and environmental restrictions.

a) The Onshore Model Plant

The onshore model plant is characterized by the use of an articulated arm connecting the floater to shore. The arm shore end is attached to a concrete base and the opposite end is connected to the floater. As a shallow water installation, it works ballasted to the sea bottom instead of using a free damper. Between the floater and the ballast, the vertical bar is composed of a telescopic hydraulic system to compensate the tide variation levels. The high pressure equipment and the electricity generation group stand on shore along the coast line. Installed power is determined by the number of pumping modules arranged side by side with free spacing of the order of the floater diameter. The connection of the generated electricity to grid is done by either aerial or subterranean cables.

b) The Near Shore Model Plant

The near shore model plant works without arms. Similarly to the onshore model it is linked to ballast on the sea bottom. A telescopic hydraulic system is also employed to compensate tide variation levels. The high pressure equipment and the electricity generation group are installed inside one of the floaters (or on a fixed platform) and receive the pressurized water from all the pumping modules. This particular floater is called the generation module. The total plant power is defined by the number of pumping modules working together, either in line or in array configuration. The plant is anchored at the bottom by anchor cables. The transmission of the generated electricity to the grid is done by subsea cables.

c) The Offshore Model Plant

The offshore model plant differs from the near shore model by using a self positioned damper instead of ballast. It operates in deep waters and does not require a telescopic hydraulic system to compensate tide variations. The high pressure equipments and the electricity generation group are installed inside one of the floaters and receive pressurized water from all the pumping modules. The total plant power is defined by the number of pumping modules working together, either in line or in array configuration.

The plant maintains its position at the ocean location either by mooring cables anchored at the sea bottom or through a dynamic positioning system. Transmission of the generated electricity to the grid is done by subsea cables.

Process and Operational Parameters

Power plant installed capability is obtained by multiplying the water jet outflow by the water pressure supplied by the hyperbaric chamber during the operation. This pressure in a conventional hydroelectric plant is provided by the outflow from the waterfall height (potential energy). The operational pressure range of the plant is associated with the predominant sea conditions at the location point, such as average period and significant wave height.

The plant operates in a closed circuit, pumping fresh water from a storage tank to the hydraulic accumulator. The inflow rate of water pumped from the pumping modules to the hydraulic accumulator must be the same as the water jet released from the hydraulic accumulator to move the turbine. The water supplied to the accumulator by the pumping modules maintains constant the system pressure during operation. The main role of the accumulator is to guarantee the pressure level stability. A water outflow electronic control monitors the turbine rotation in order to actuate properly on a high pressure valve providing efficiency and regularity to the electricity generation on both electrical voltage and frequency. This valve was designed for power control during the variations in either electricity demand or sea conditions. The high pressure valve can be also used to stop the plant operation in cases of predictive maintenance and emergency situation.

DRAWING'S DESCRIPTION

Figure 1:
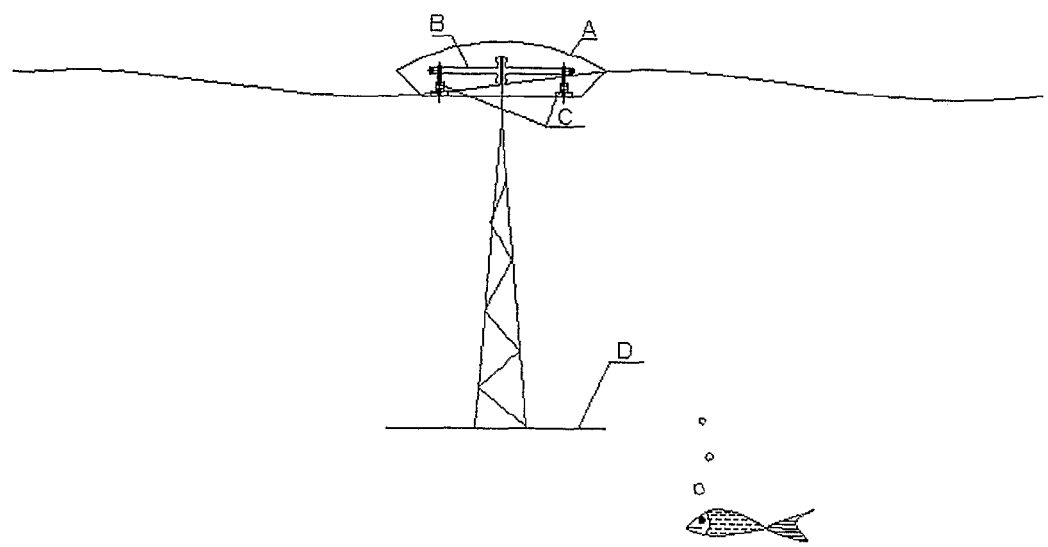
FIG. 1 illustrates the equipment of a pumping module, where A represents the floater, B the mechanical load amplifier system, C the hydraulic pumps and D the damper (offshore model plant).
Figure 2:
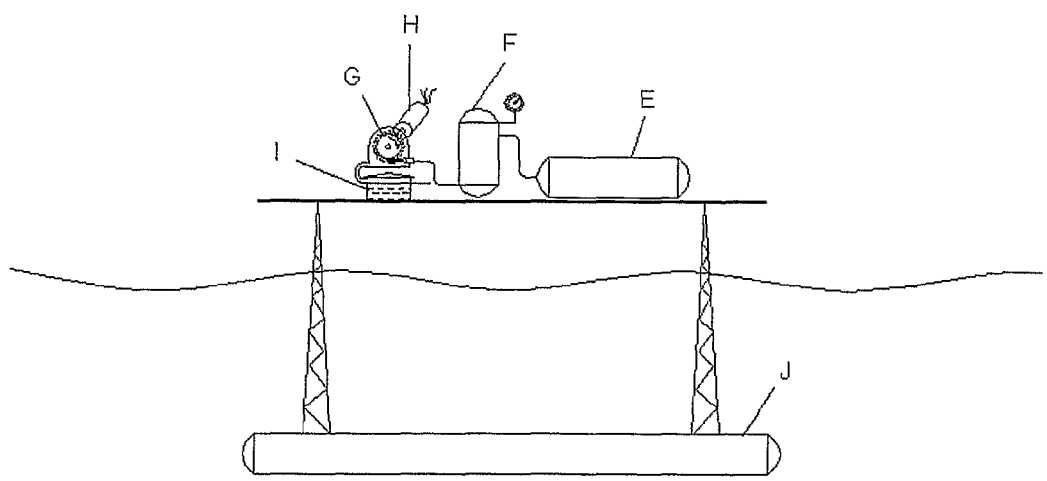
FIG. 2 shows the floating platform to be used for the high pressure system and the generating group. E represents the hyperbaric chamber, F the hydro pneumatic accumulator, G the hydraulic turbine, H the electric generator, I the fresh water reservoir and J the floater.
Figure 3:
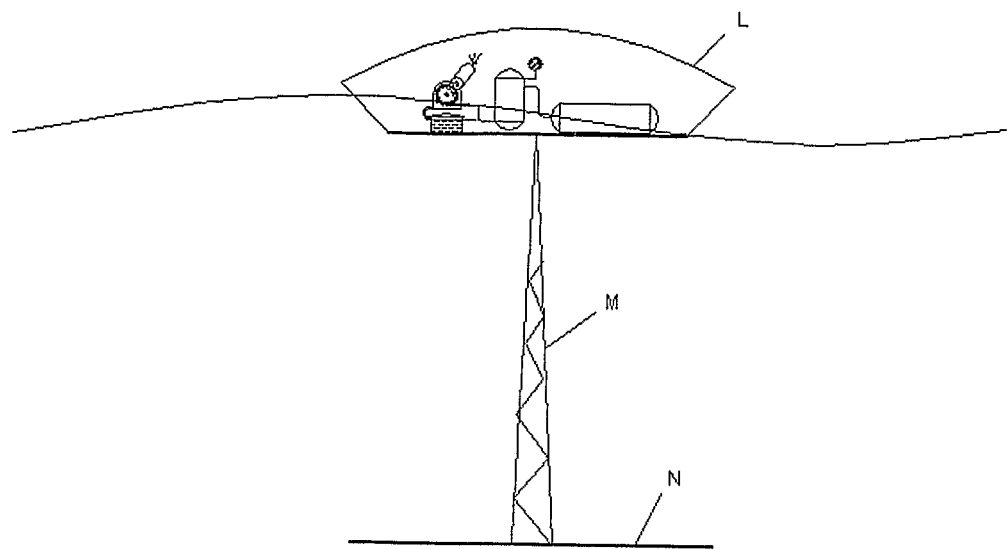
FIG. 3 shows the alternative installation of the same equipment, as described above, inside one of the floaters, which will be dedicated to accommodate both high pressure system and generating group. In the figure, L represents the floater, M the steel truss connecting the floater to the damper and N the damper.
Figure 4:
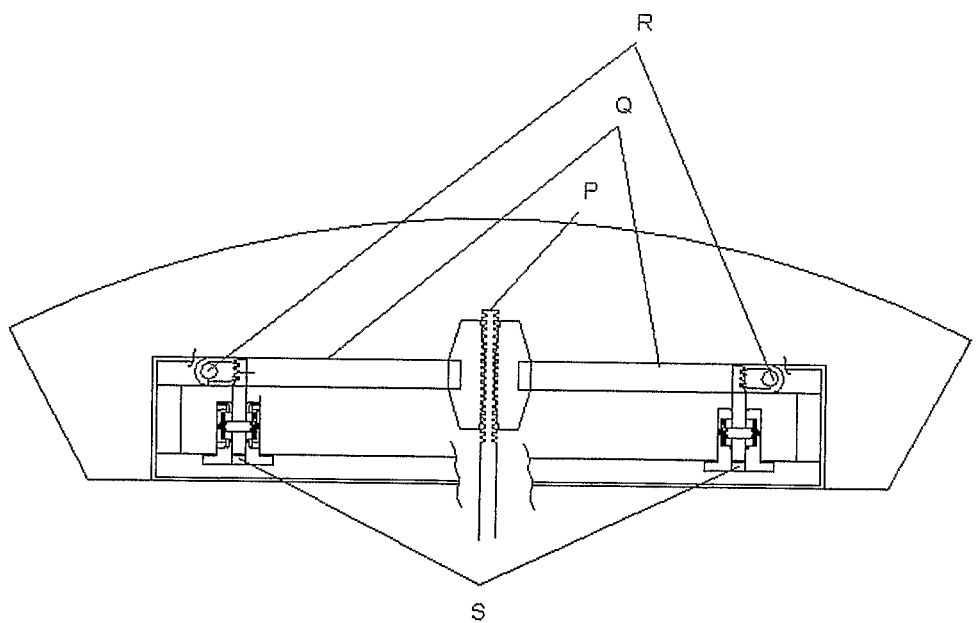
FIG. 4 shows of the mechanical load amplifier system inside the floater, where P represents the double gear rack that moves the levers according to the floater heave motion, Q the geared sector connected to the articulated levers at the two points R, and S the hydraulic pumps.
Figure 5:
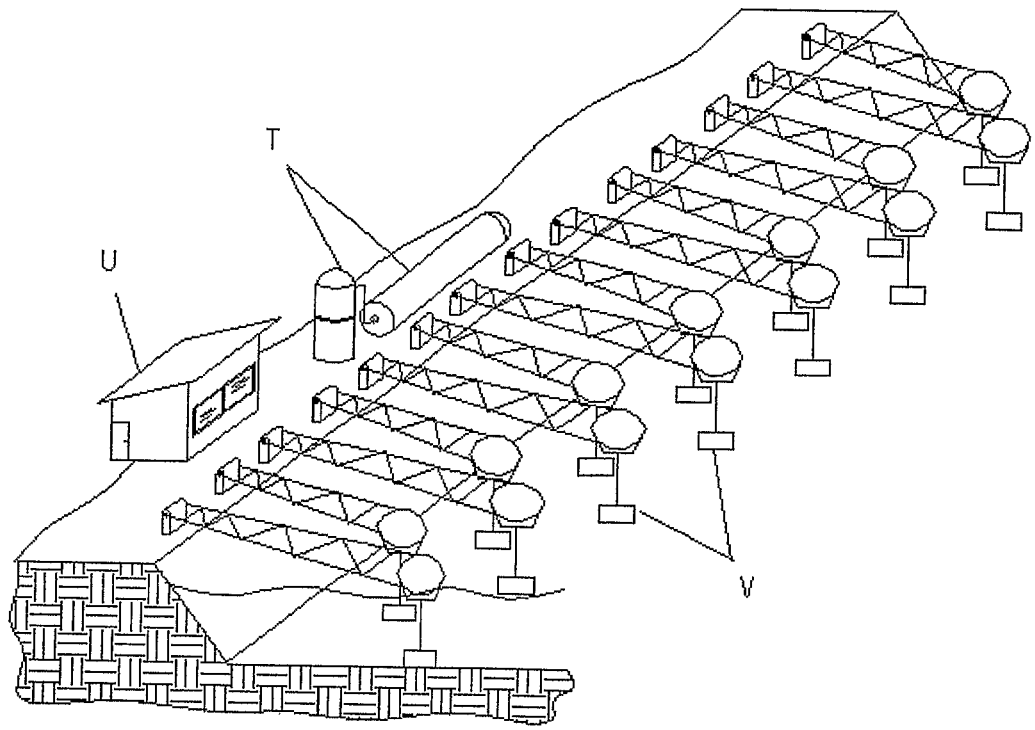

FIG. 5 shows a complete onshore wave energy plant. One of the arm ends is attached to a concrete base positioned on shore and the opposite end is connected to the floater. As a shallow water installation, it works ballasted on the sea bottom without the need of the damper device. In the figure, T represents the high pressure system, U the generation room and V the ballast attached to each floater.

Figure 6:
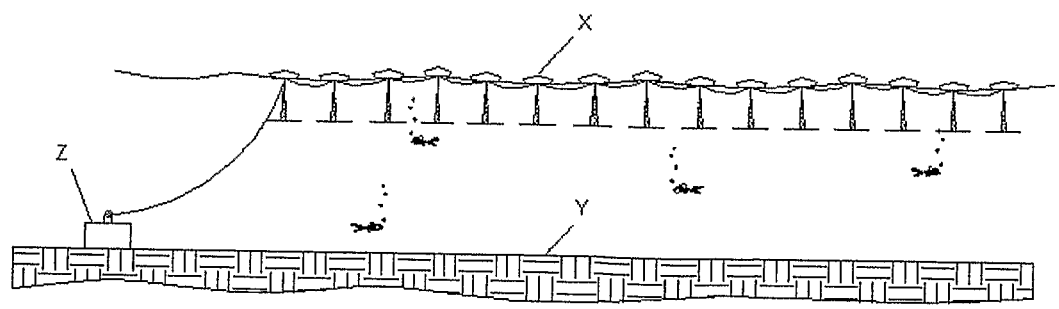

FIG. 6 shows a complete offshore wave energy plant, where X represents one of the pumping modules, Y the sea bottom and Z the single ballast for the whole plant. The pumping modules are connected to each other at the top of the damper tower through a truss steel structure with universal joints at each end. The optimum positioning of the floater in relation to the damper is controlled by a hydro pneumatic system to be described below. The pressurized water from each pumping module is sent to the high pressure/generation group through a flexible pipe. The whole plant is positioned at the sea by the use of single ballast on the sea bottom. Each floater of the plant operates connected to the neighbor ones.

Figure 7:
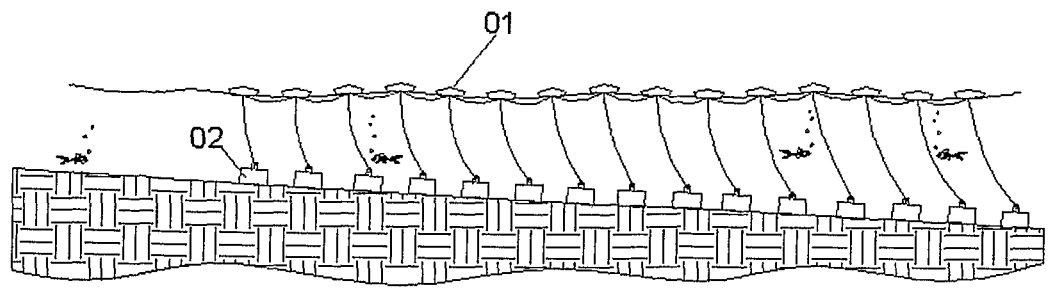

FIG. 7 shows a complete near shore wave energy plant. Each pumping module is anchored to ballast on the sea bottom. The number 01 represents a floater of the plant. Number 02 is the ballast of the plant (anchoring system). The pumping units are connected to each other bellow the floater, by a mechanical bar with a universal joint at each end. The first floater located much closer to the shoreline is used to accommodate the high pressure system/generation group. It receives the pressurized water from all the pumping modules for storage in the high pressure system and then release to the generation group to produce electricity. Electrical cables will transmit the produced electricity to onshore facilities by subse a flexible electrical cables.

Figure 8:
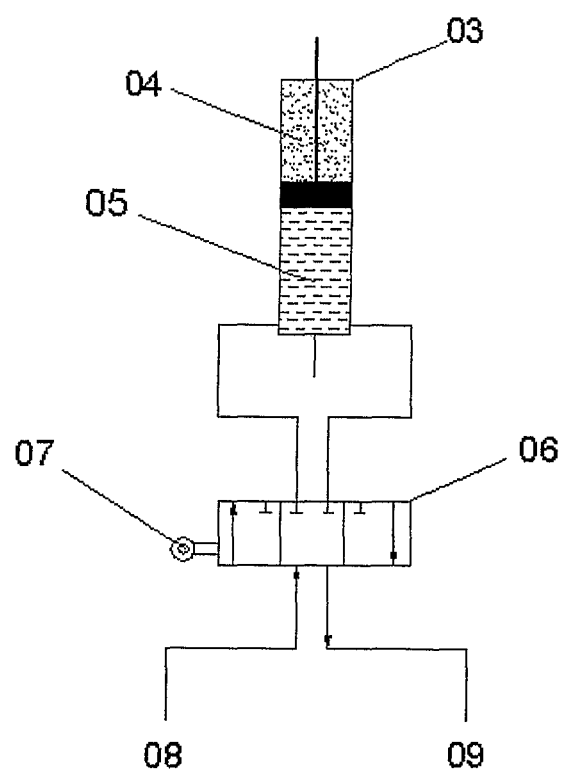

FIG. 8 shows a sketch of the hydro pneumatic control system for the damper self positioning. The number 03 represents a hydro pneumatic cylinder, 04 the cylinder compartment that operates with nitrogen gas in variable pressure, 05 the cylinder compartment that operates with water in high pressure, 06 the two way hydraulic valve, 07 the valve's lever that receives the input movements (feed back) from the damper adjusting automatically its position, 08 the high pressure water feed and 09 the flow out of water at atmosphere pressure. The control system is connected to the damping tower. It works by changing the volume of the gas inside the cylinder compartment. Variation of the gas volume has an effect on damper position.

ADVANTAGES OF THE WAVE ENERGY PLANT FOR ELECTRICITY GENERATION

Production of clean and renewable energy without significant environment impacts.

Contribution with additional electricity to the existing grid.

Supply of electricity to islands or other distant places of the coast not reached by the electricity grid system.

Modular and compact installations requiring low water outflows and high pressures for operation, which means low expenditure costs.

Possibility of being installed in three different scenarios: onshore, near shore (shallow waters) and offshore (deep waters).

Possibility of progressive increase of the generation power plant by adding new modules to the existing plant.

The equipments listed in the present invention do not have to be considered as definitive. Therefore, the number and sort of equipments can suffer variations according to the site and sea characteristics where the plant is to be installed.

The invention claimed is:

1. Hybrid wave energy plant for electricity generation, comprising a mechanical and hydraulic installation including a pumping module having a mechanical load amplifier system installed inside a floater and connected to a self positioning controlled damper assembled below the sea water surface, the damper being disposed at a distance from the mechanical load amplifier system of a half wavelength or larger of waves on the sea water based on historical measurements of waves at an installation site.

2. Hybrid wave energy plant for electricity generation according to claim 1, wherein the mechanical load amplifier system installed inside the floater is linked to a damper to move two vertical hydraulic piston pumps.

3. Hybrid wave energy plant for electricity generation according to claim 1, further comprising two hydraulic vertical pumps moved by floater action.

4. Hybrid wave energy plant for electricity generation according to claim 1, further comprising a high pressure system including a hyperbaric chamber linked to a hydro pneumatic accumulator.

5. Hybrid wave energy plant for electricity generation according to claim 4, characterized by pressure operation up to 3,000 psi.

6. Hybrid wave energy plant for electricity generation according to claim 4, wherein the hyperbaric chamber operates as a lung, to avoid undesirable pressure variation during operation.

7. Hybrid wave energy plant for electricity generation according to claim 6, wherein the hydro pneumatic accumulator maintains a constant water flow during small variations of sea wave height.

8. Hybrid wave energy plant for electricity generation according to claim 1, further comprising a hydro pneumatic accumulator to store separately nitrogen gas and water both under high pressure.

9. Hybrid wave energy plant for electricity generation according to claim 8, further comprising a high pressure flow valve to move a generation group to produce electricity.

10. Hybrid wave energy plant for electricity generation according to claim 1, further comprising an automatic damper positioning controller.

11. Hybrid wave energy plant for electricity generation according to claim 10, wherein the automatic damper positioning controller comprises a hydro pneumatic cylinder operated by a two way hydraulic valve, which, in turn, is operated by damper motion.

12. Hybrid wave energy plant for electricity generation according to claim 1 wherein a telescopic hydraulic system is linked to ballast at sea bottom (anchor system) to compensate for tide variation levels for onshore and near shore applications.

13. Hybrid wave energy plant for electricity generation according to claim 1, characterized by the installation of equipment associated with both a high pressure system and a generation group, including a hyperbaric chamber, a hydro pneumatic accumulator, a turbine, a water reservoir and an electric generator, all inside one of the floaters designed to accommodate them.

14. Hybrid wave energy plant for electricity generation according to claim 13, characterized by a floating platform holding the hyperbaric chamber, the hydro pneumatic accumulator, the fresh water reservoir, the hydraulic turbine and the electric generator.

15. Hybrid wave energy plant for electricity generation according to claim 13, characterized by a sea bottom fixed platform holding the hyperbaric chamber, the hydro pneumatic accumulator, the fresh water reservoir, the hydraulic turbine and the electric generator.

16. Hybrid wave energy plant for electricity generation according to claim 13, characterized by linkage of up to 16 (sixteen) pumping modules in a chain, including the high pressure system and the generation group.

17. Hybrid wave energy plant for electricity generation according to claim 1, characterized by the installation, on shore, of concrete bases side-by-side for the articulation of arms, and pumping modules connected at a free end of each arm.

18. Hybrid wave energy plant for electricity generation according to claim 17, characterized by said arms having the function of keeping every pumping module operating at its own site.

19. Hybrid wave energy plant for electricity generation according to claim 1, characterized in that the plant installation is one of on shore, near shore, and offshore.

* * * * *